United States Patent
Itatsu

(10) Patent No.: US 12,001,831 B2
(45) Date of Patent: Jun. 4, 2024

(54) ONBOARD UPDATE APPARATUS AND UPDATE PROCESSING PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Taro Itatsu, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 64 days.

(21) Appl. No.: 17/756,170

(22) PCT Filed: Nov. 4, 2020

(86) PCT No.: PCT/JP2020/041155
§ 371 (c)(1),
(2) Date: May 18, 2022

(87) PCT Pub. No.: WO2021/100462
PCT Pub. Date: May 27, 2021

(65) Prior Publication Data
US 2022/0413832 A1   Dec. 29, 2022

(30) Foreign Application Priority Data
Nov. 19, 2019 (JP) .................. 2019-208892

(51) Int. Cl.
*G06F 8/65* (2018.01)
*B60W 50/00* (2006.01)

(52) U.S. Cl.
CPC ............... *G06F 8/65* (2013.01); *B60W 50/00* (2013.01); *B60W 2050/0083* (2013.01); *B60W 2556/45* (2020.02)

(58) Field of Classification Search
CPC . G06F 8/65; B60W 50/00; B60W 2050/0083; B60W 2556/45; B60R 16/02; H04L 12/46
See application file for complete search history.

(56) References Cited

U.S. PATENT DOCUMENTS

| | | | | |
|---|---|---|---|---|
| 10,489,141 | B2* | 11/2019 | Nakamura | ............... H04L 12/40 |
| 2011/0124325 | A1* | 5/2011 | Choi-Grogan | .......... H04L 67/34 |
| | | | | 455/419 |

(Continued)

FOREIGN PATENT DOCUMENTS

| | | |
|---|---|---|
| JP | 2005-135147 A | 5/2005 |
| JP | 2016-203719 A | 12/2016 |

OTHER PUBLICATIONS

International Search Report, Application No. PCT/JP2020/041155, dated Dec. 28, 2020. ISA/Japan Patent Office.

*Primary Examiner* — Daxin Wu
(74) *Attorney, Agent, or Firm* — Honigman LLP

(57) ABSTRACT

An onboard update apparatus includes a control unit that controls adoption of an update program by an onboard ECU installed in a vehicle, wherein the control unit attempts to communicate with an external server outside of the vehicle when a target onboard ECU for updating adopts the update program stored in a predetermined storage area in the vehicle; in a case where communication with the external server is successful, in a case where information relating to cancelation of the update program is acquired, adoption of the update program by the target onboard ECU for updating is canceled, and in a case where the information relating to cancelation cannot be acquired, the target onboard ECU for updating adopts the update program; and in a case where (Continued)

communication with the external server has failed, the target onboard ECU for updating adopts the update program.

6 Claims, 6 Drawing Sheets

(56) References Cited

U.S. PATENT DOCUMENTS

| | | | |
|---|---|---|---|
| 2012/0257248 A1* | 10/2012 | Sato | G06F 8/65 |
| | | | 358/1.15 |
| 2013/0346796 A1* | 12/2013 | Niwa | G06F 11/1402 |
| | | | 714/15 |
| 2016/0013934 A1* | 1/2016 | Smereka | H04W 12/033 |
| | | | 713/171 |
| 2017/0090907 A1 | 3/2017 | Kurosawa et al. | |
| 2017/0139778 A1* | 5/2017 | Kito | G06F 11/1433 |
| 2018/0208208 A1* | 7/2018 | Chen | B60R 16/037 |
| 2021/0182048 A1* | 6/2021 | Harata | G06F 8/65 |
| 2022/0004374 A1* | 1/2022 | Kamiguchi | G06F 8/65 |

* cited by examiner

FIG. 3

| Identification information table | |
|---|---|
| Priority order | Identification information |
| 1 | XXX-XXX-XXX |
| 2 | XXX-XXX-XXX |

ONBOARD UPDATE APPARATUS AND UPDATE PROCESSING PROGRAM

CROSS-REFERENCE TO RELATED APPLICATIONS

This application is the U.S. national stage of PCT/JP2020/041155 filed on Nov. 4, 2020, which claims priority of Japanese Patent Application No. JP 2019-208892 filed on Nov. 19, 2019, the contents of which are incorporated herein.

TECHNICAL FIELD

The present disclosure relates to an onboard update apparatus and an update processing program. This application claims priority based on Japanese Patent Application No. 2019-208892 filed on Nov. 19, 2019, the contents of which are incorporated herein by reference.

BACKGROUND

Onboard electronic control unit (ECU) for controlling onboard devices, such as a powertrain system for engine control, a body system for air conditioner control, and the like, are installed in vehicles. An onboard ECU includes an arithmetic processing unit such as a micro processing unit (MPU), a rewritable, non-volatile storage unit such as an electrically erasable programmable ROM (EEPROM) or a flash memory, and a communication unit for communicating with other onboard ECUs. The onboard ECU controls onboard devices by reading and executing a control program stored in the storage unit. A relay apparatus (onboard update apparatus) with a wireless communication function is mounted in the vehicle, and, through the relay apparatus, communication is achieved with a program providing apparatus connected to a network outside of the vehicle. The control program of the onboard ECU can be updated (see JP 2017-97851A, for example) by downloading (receiving) the control program of the onboard ECU from the program providing apparatus.

The relay apparatus of JP 2017-97851A does not take into account how to deal with a case where, after a control program is downloaded to the vehicle, there is a notification relating to cancelation of the adoption of the control program from a program providing apparatus in the time before the control program is adopted (activated) by a target onboard ECU for updating.

In light of the foregoing, the present disclosure is directed at providing an onboard update apparatus or the like that is capable of taking appropriate measures in a case where, after a control program is downloaded to the vehicle, there is a notification relating to cancelation of the adoption of the control program from a program providing apparatus in the time before the control program is adopted by a target onboard ECU for updating.

SUMMARY

An onboard update apparatus according to an aspect of the present disclosure includes: a control unit configured to control adoption of an update program by an onboard ECU installed in a vehicle, wherein the control unit attempts to communicate with an external server outside of the vehicle when a target onboard ECU for updating adopts the update program stored in a predetermined storage area in the vehicle; in a case where communication with the external server is successful, in a case where information relating to cancelation of the update program is acquired, adoption of the update program by the target onboard ECU for updating is canceled, and in a case where the information relating to cancelation cannot be acquired, the target onboard ECU for updating adopts the update program; and in a case where communication with the external server has failed, the target onboard ECU for updating adopts the update program.

Advantageous Effects of Invention

According to an aspect of the present disclosure, appropriate measures can be taken in a case where, after a control program is downloaded to the vehicle, there is a notification relating to cancelation of the adoption of the control program from a program providing apparatus in the time before the control program is adopted by a target onboard ECU for updating.

BRIEF DESCRIPTION OF THE DRAWINGS

FIG. 3 is a conceptual diagram indicating an example of the contents of an identification information table.

DETAILED DESCRIPTION OF PREFERRED EMBODIMENTS

Figure 1:
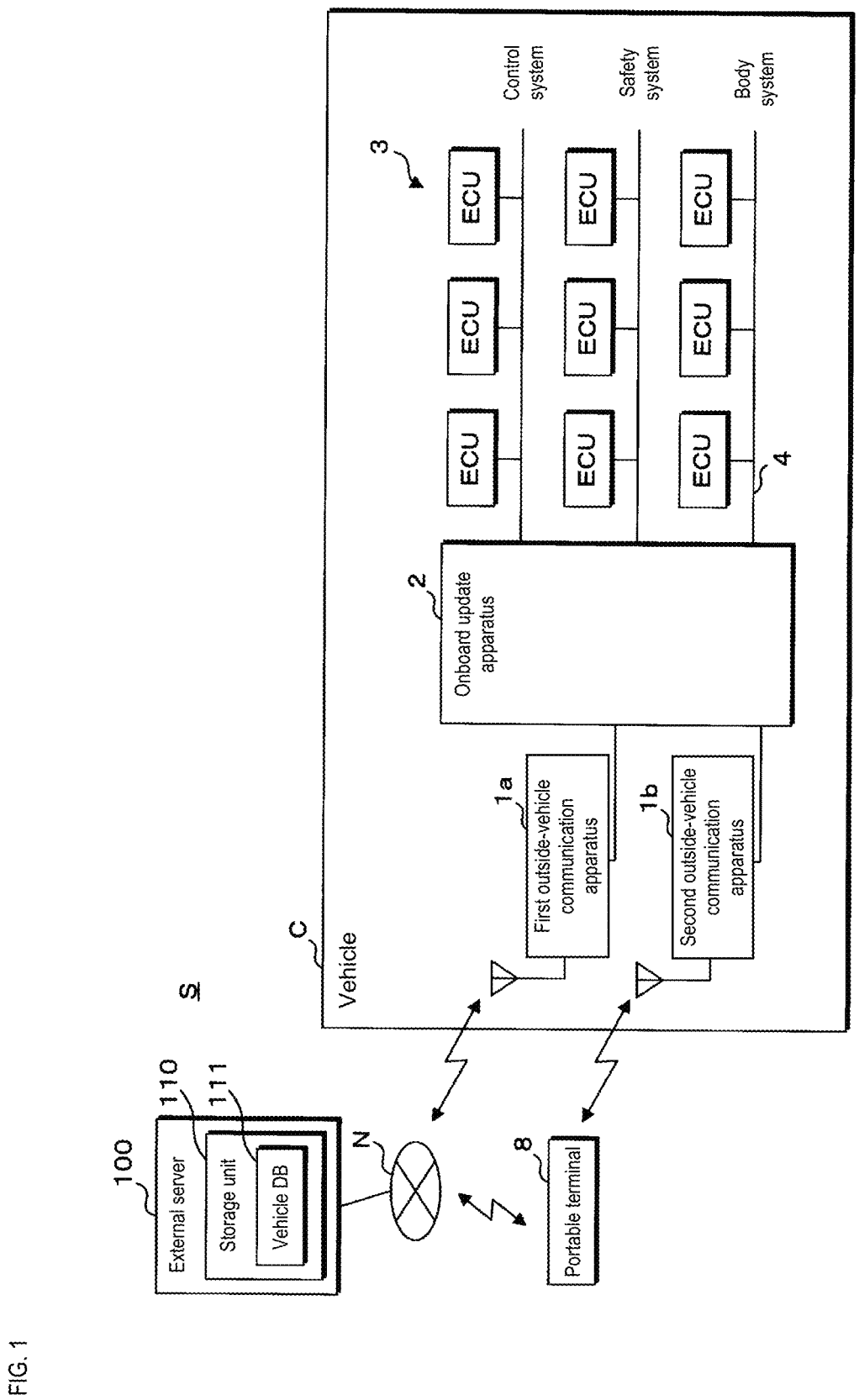
FIG. 1 is a schematic diagram illustrating the configuration of an onboard update system according to a first embodiment.

Firstly, embodiments of the present disclosure will be listed and described. One or more parts of the embodiments described below may be combined in a discretionary manner.

First Aspect

An onboard update apparatus according to a first aspect of the present disclosure includes: a control unit that controls adoption of an update program by an onboard ECU installed in a vehicle, wherein the control unit attempts to communicate with an external server outside of the vehicle when a target onboard ECU for updating adopts the update program stored in a predetermined storage area in the vehicle; in a case where communication with the external server is successful, in a case where information relating to cancelation of the update program is acquired, adoption of the update program by the target onboard ECU for updating is canceled, and in a case where the information relating to cancelation cannot be acquired, the target onboard ECU for updating adopts the update program; and in a case where communication with the external server has failed, the target onboard ECU for updating adopts the update program.

According to the first aspect, after the update program is stored in a predetermined storage area, the control unit attempts to communicate with the external server to confirm whether or not the information relating to cancelation of the update program is stored in the external server. Accordingly, in a case where a problem is found in the already stored update program and the information relating to cancelation of the update program is stored (prepared) in the external server, the information relating to cancelation can be acquired. The update program is acquired from the external server, for example. In a case where communication with the external server is successful and the information relating to cancelation of the stored update program can be acquired, the control unit cancels the adoption of the update program. In a case where communication with the external server by the control unit is successful and the information relating to cancelation of the stored update program cannot be acquired, the update program is adopted. Thus, the update program relating to the information relating to cancelation can be prevented from being adopted by the target onboard ECU for updating. In a case where communication with the external server by the control unit has failed, the stored update program is adopted by the target onboard ECU for updating. Accordingly, even in a case where a non-communicative state with the external server continues, the update program can be adopted by the target onboard ECU for updating and the program used by the target onboard ECU for updating can be appropriately set. The predetermined storage area in the vehicle includes a storage unit of the onboard update apparatus, a storage unit of the onboard ECU, or a storage apparatus that the onboard update apparatus is capable of accessing.

Second Aspect

In the onboard update apparatus according to a second aspect of the present disclosure, communication with the external server includes communication via an outside-vehicle communication apparatus connected to the onboard update apparatus and provided in the vehicle, and communication via a portable terminal connected to the onboard update apparatus; communication with the outside-vehicle communication apparatus is preferentially performed over communication with the portable terminal; and in a case where the control unit has failed to communicate with both the outside-vehicle communication apparatus and the portable terminal, the target onboard ECU for updating adopts the update program.

According to the second aspect, communication between the control unit (the onboard update apparatus) and the external server is performed via the outside-vehicle communication apparatus or the portable terminal. Thus, even in a case where the vehicle is out of range of the communication network of the outside-vehicle communication apparatus, communication with the external server can be attempted using the communication network of the portable terminal. Communication using the outside-vehicle communication apparatus is preferentially performed over communication using the portable terminal. In a case where communication between the outside-vehicle communication apparatus and the external server is established, the control unit communicating with the external server via the outside-vehicle communication apparatus allows for communication with the external server without using the bandwidth of the portable terminal. Also, communication with the external server can be performed without using a communication amount with a set upper limit per the portable terminal. In a case where the control unit has failed to communicate using both the outside-vehicle communication apparatus and the portable terminal, the stored update program is adopted by the target onboard ECU for updating. Accordingly, even in a case where a non-communicative state with the external server continues, the update program can be adopted by the target onboard ECU for updating and the program used by the target onboard ECU for updating can be appropriately set.

Third Aspect

In the onboard update apparatus according to a third aspect of the present disclosure, identification information for identifying the portable terminal is stored in the predetermined storage area in the vehicle; the identification information is associated with a vehicle identification number of the vehicle and stored in a storage area to which the external server is capable of referencing; and the control unit establishes communication with the portable terminal on the basis of the identification information.

According to the third aspect, the identification information for identifying the portable terminal is stored in the predetermined storage area in the vehicle. Because the onboard update apparatus communicates with the external server via the portable terminal, for example, by pairing with the portable terminal, the validity of the target portable terminal for pairing can be confirmed on the basis of the identification information. This allows the security of the pairing between the onboard update apparatus and the portable terminal to be ensured. The identification information is associated with the vehicle identification number of the vehicle and stored in a storage area that the external server is capable of referencing. In a case where the external server has been communicating with the onboard update apparatus via the portable terminal, the validity of the portable terminal can be determined on the basis of a combination of the vehicle identification number of the vehicle installed with the onboard update apparatus and the identification information of the portable terminal. This allows the security of the communication between the external server and the onboard update apparatus via the portable terminal to be ensured. The storage area that the external server is capable of referencing includes the storage unit of the external server or a storage apparatus capable of being accessed from the external server.

Fourth Aspect

In the onboard update apparatus according to a fourth aspect of the present disclosure, a plurality of pieces of the identification information assigned with a priority order for communication with the external server are stored in the predetermined storage area in the vehicle; and communication with the external server via the portable terminal is attempted by the control unit on the basis of the priority order.

According to the fourth aspect, even in a case where a plurality of portable terminals are brought by the occupant into the vehicle, the control unit, for example, references the predetermined storage area in the vehicle, such as its storage unit or the like, reads out the priority order, and attempts to communicate with the external server via the portable terminals on the basis of the priority order. This prevents a plurality of communication with the external server being established at the same time via the plurality of portable terminals, which helps to prevent congestion between the onboard update apparatus and the external server.

Fifth Aspect

In the onboard update apparatus according to a fifth aspect of the present disclosure, when the update program is adopted by the target onboard ECU for updating, the control unit outputs confirmation screen data constituting a confirmation screen for confirming whether or not adoption is necessary; in a case where there is an input indicating that adoption is necessary at the confirmation screen, the update program is adopted by the target onboard ECU for updating; and the confirmation screen data output is different in a case where the information relating to cancelation is not acquired and in a case where communication with the external server has failed.

According to the fifth aspect, the control unit outputs the confirmation screen data constituting the confirmation screen for confirming whether or not the update program needs to be adopted (accepted). Regarding the confirmation screen data, the output contents are different between a case where communication with the external server is successful but the information relating to cancelation of the stored update program cannot be acquired and a case where communication with the external server has failed. By outputting different confirmation screen data depending on the case, appropriate information can be provided to the person, such as the operator of the vehicle, who confirms whether or not adoption of the update program is necessary.

Sixth Aspect

In the onboard update apparatus according to a sixth aspect of the present disclosure, in a case where the information relating to cancelation is acquired, the control unit outputs notification screen data constituting a notification screen for notifying of cancelation of adoption of the update program by the target onboard ECU for updating.

According to the sixth aspect, in a case where the information relating to cancelation of the stored update program is acquired, the control unit outputs the notification screen data constituting the notification screen for notifying of cancelation of adoption of the update program by the target onboard ECU for updating. By outputting the notification screen data, the occupant of the vehicle can be notified of the cancelation of the adoption of the update program.

Seventh Aspect

In the onboard update apparatus according to a seventh aspect of the present disclosure, in a case where communication with the external server has failed, the control unit stores a current program of the target onboard ECU for updating when the target onboard ECU for updating adopts the update program.

According to the seventh aspect, in a case where communication with the external server has failed, whether or not there is the information relating to cancelation of the update program cannot be confirmed at the time when the update program is adopted. The control unit executes processing to store the current program of the target onboard ECU for updating upon the adoption of the update program, in other words the program corresponding to the previous version of the update program. Accordingly, in a case where communication with the external server has failed, when the information relating to cancelation of the update program adopted by the target onboard ECU for updating is acquired by the control unit after adoption, rollback processing can be executed using the stored current program.

Eighth Aspect

In the onboard update apparatus according to an eighth aspect of the present disclosure, in a case where the target onboard ECU for updating has adopted the update program, the control unit stores, in the predetermined storage area in the vehicle, history information storing information indicating that the target onboard ECU for updating has adopted the update program and information relating to whether or not communication with the external server is successful that are associated together.

According to the eighth aspect, the stored update program is adopted by the target onboard ECU for updating in a case where communication with the external server is successful but the information relating to cancelation of the update program cannot be acquired and in a case where communication with the external server has failed. Alternatively, in a case where the target onboard ECU for updating has adopted the update program, history information storing information indicating that the target onboard ECU for updating has adopted the update program and information relating to whether or not communication with the external server is successful that are associated together is stored in the predetermined storage area. Accordingly, the update program being adopted by the target onboard ECU for updating can be stored as the history information in any case, allowing traceability relating to updating the program of the onboard ECU to be ensured.

Ninth Aspect

An update processing program according to ninth aspect of the present disclosure that causes a computer to execute processing including attempting to communicate with an external server outside of the vehicle when a target onboard ECU for updating adopts an update program stored in a predetermined storage area in a vehicle; in a case where communication with the external server is successful, canceling adoption of the update program by the target onboard ECU for updating in a case where information relating to cancelation of the update program is acquired, and the target onboard ECU for updating adopting the update program in a case where the information relating to cancelation cannot be acquired; and in a case where communication with the external server has failed, the target onboard ECU for updating adopting the update program.

According to the ninth aspect, the computer can function as an onboard update apparatus according to an aspect of the present disclosure.

The present disclosure will be described in detail below with reference to diagrams of embodiments of the present disclosure. An onboard update apparatus 2 according to an embodiment of the present disclosure will be described with reference to the following diagrams. Note that the present disclosure is not limited to these examples. The present invention is defined by the scope of the claims, and all modifications that are equivalent to or within the scope of the claims are included.

First Embodiment

Figure 2:
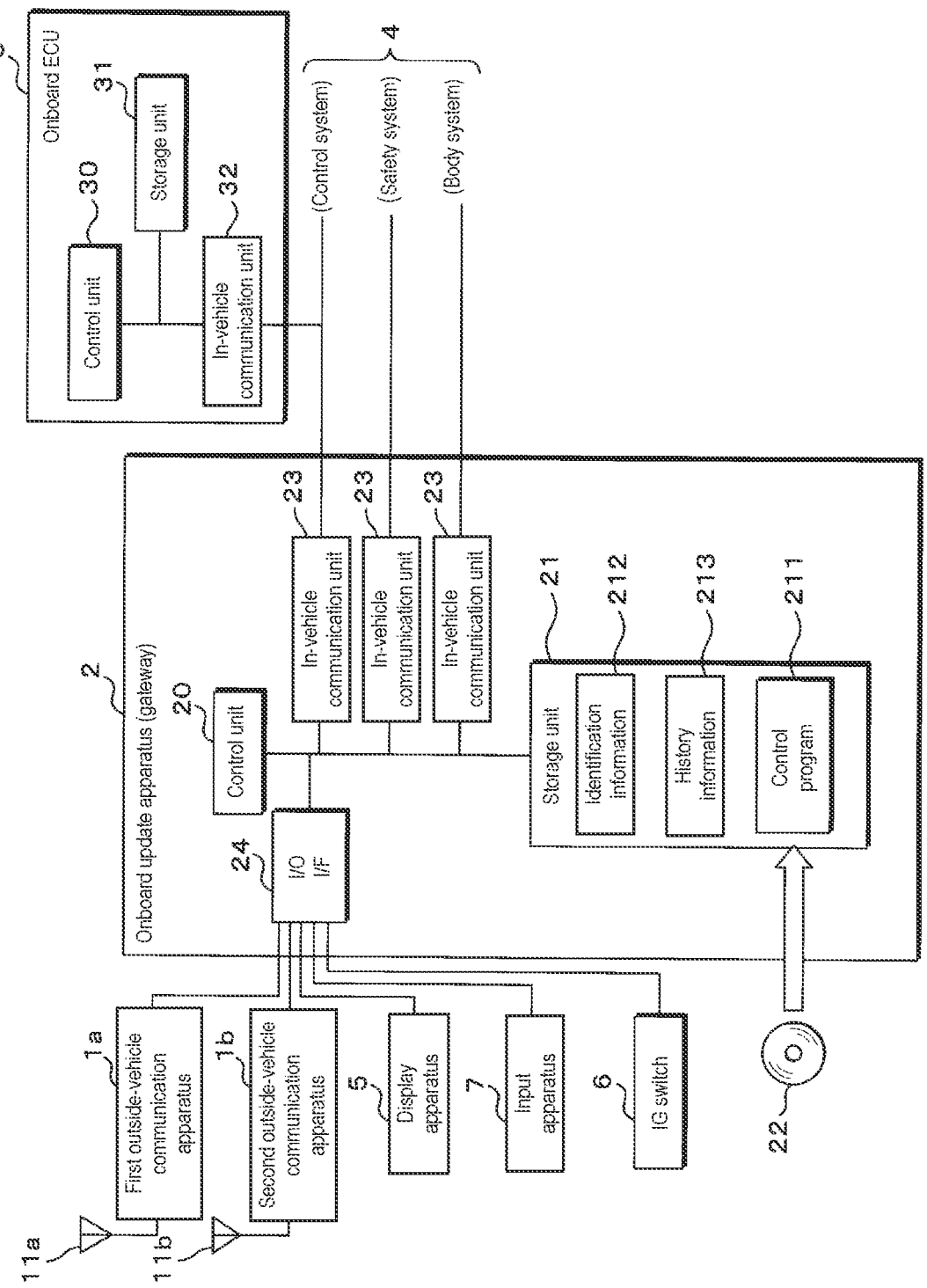
FIG. 2 is a block diagram illustrating the configuration of an onboard update apparatus according to the first embodiment.

An embodiment will be described below with reference to diagrams. FIG. 1 is a schematic diagram illustrating the configuration of an onboard update system S according to the first embodiment. FIG. 2 is a block diagram illustrating the configuration of the onboard update apparatus 2 according to the first embodiment.

The onboard update system S includes a first outside-vehicle communication apparatus 1a, a second outside-vehicle communication apparatus 1b, the onboard update apparatus 2, and a portable terminal 8 installed in a vehicle C. Also, an update program acquired from an external server (program providing apparatus) 100 connected via an outside-vehicle network N is adopted by an onboard ECU (onboard control apparatus) 3 installed in the vehicle C to update the program of the onboard ECU 3.

The external server 100 is a computer such as a server connected to the outside-vehicle network N, such as the Internet or a public network and is provided with a storage unit 110 constituted by a random access memory (RAM), a read only memory (ROM), a hard disk, or the like. A program or data for controlling the onboard ECU 3 created by the manufacturer or the like of the onboard ECU 3 is stored in the storage unit 110 of the external server 100. The program or data is, as the update program, transmitted to the vehicle C and used to update the program or data of the onboard ECU 3 installed in the vehicle C. Information relating to canceling the update program is stored in the storage unit 110. The information relating to canceling the update program is stored (prepared) in a case where a problem is found in the update program, for example, and transmitted from the external server 100 to the vehicle C. The external server 100 configured as such may also be referred to as an Over-the-Air (OTA) server. The information relating to canceling the update program may be stored in a storage unit constituted by a non-volatile memory of a non-illustrated computer capable of communication with the external server 100, for example. The onboard ECU 3 installed in the vehicle C is used as a program for executing the update program transmitted from the external server 100 via wireless communication, allowing the program executed by the onboard ECU 3 to be updated (reprogrammed). The update program may be read out by the onboard ECU 3 from a storage medium readable by the onboard ECU 3, for example. In the storage unit 110 of the external server 100, a vehicle identification number (VIN) of the vehicle C and identification information 212 described below are associated together, recorded, and stored in a vehicle database (DB) 111.

A plurality of onboard ECUs 3 are installed in the vehicle C. The onboard ECUs 3 are for controlling the first outside-vehicle communication apparatus 1*a*, the second outside-vehicle communication apparatus 1*b*, a display apparatus 5, an ignition (IG) switch 6, an input apparatus 7, and various onboard devices. The onboard update apparatus 2, the first outside-vehicle communication apparatus 1*a*, and the second outside-vehicle communication apparatus 1*b* are communicatively connected via a wire harness such as a serial cable, for example. The onboard update apparatus 2 and the onboard ECUs 3 are communicatively connected via an in-vehicle LAN 4 compatible with a communication protocol, such as a controller area network (CAN, registered trademark) or Ethernet (registered trademark).

The first outside-vehicle communication apparatus 1*a* and the second outside-vehicle communication apparatus 1*b* each include a outside-vehicle communication unit (not illustrated) and an I/O (Input/Output) interface (I/F, not illustrated) for communicating with the onboard update apparatus 2. The outside-vehicle communication unit is a communication apparatus for wireless communication using a mobile communications protocol, such as 3G, LTE, 4G, 5G, Wi-Fi (registered trademark), or Bluetooth (registered trademark). The outside-vehicle communication unit of the first outside-vehicle communication apparatus 1*a*, for example, performs wireless communication using 3G, LTE, 4G, or 5G and communicates (transmits and receives data) with the external server 100 via an antenna 11*a* connected to the outside-vehicle communication unit. The communications between the first outside-vehicle communication apparatus 1*a* and the external server 100 are performed via the outside-vehicle network N, such as a public network, the Internet, or the like. The first outside-vehicle communication apparatus 1*a* regularly connects to the onboard update apparatus 2 and corresponds to an outside-vehicle communication apparatus in the claims.

The outside-vehicle communication unit of the second outside-vehicle communication apparatus 1*b* performs wireless communication using Wi-Fi (registered trademark) or Bluetooth (registered trademark) and communicates with the portable terminal 8 described below via the antenna 11*b* connected to the outside-vehicle communication unit. Even in a case where the vehicle C is outside the communication network of the first outside-vehicle communication apparatus 1*a*, the onboard update apparatus 2 is capable of attempting to communicate with the external server 100 using the communication network of the portable terminal 8. Communication (communication between the onboard update apparatus 2 and the external server 100 bypassing the portable terminal 8) between the onboard update apparatus 2 and the external server 100 via the first outside-vehicle communication apparatus 1*a* is preferentially performed over communication between the onboard update apparatus 2 and the external server 100 via the portable terminal 8. In a case where communication between the onboard update apparatus 2 and the external server 100 via the first outside-vehicle communication apparatus 1*a* is established, the onboard update apparatus 2 can communicate with the external server 100 without using the bandwidth of the portable terminal 8. Also, communication with the external server 100 can be performed without using a communication amount with a set upper limit per the portable terminal 8. One of the first outside-vehicle communication apparatus 1*a* or the second outside-vehicle communication apparatus 1*b* may communicate with both the external server 100 and the portable terminal 8. In this case, the other one of the first outside-vehicle communication apparatus 1*a* and the second outside-vehicle communication apparatus 1*b* is not necessary.

The I/O I/F of the first outside-vehicle communication apparatus 1*a* and the I/O I/F of the second outside-vehicle communication apparatus 1*b* are communication interfaces for serial communication with the onboard update apparatus 2, for example. The first outside-vehicle communication apparatus 1*a*, the second outside-vehicle communication apparatus 1*b*, and the onboard update apparatus 2 communicate with one another via a wire harness such as a serial cable connected to the I/O I/F and the I/O I/F. In the present embodiment, the first outside-vehicle communication apparatus 1*a* and the second outside-vehicle communication apparatus 1*b* are separate apparatuses from the onboard update apparatus 2 and are communicatively connected thereto via the I/O I/F or the like. However, no such limitation is intended. The first outside-vehicle communication apparatus 1*a* and the second outside-vehicle communication apparatus 1*b* may be built-in the onboard update apparatus 2 as a component of the onboard update apparatus 2.

The onboard update apparatus 2 includes a control unit 20, a storage unit 21, an in-vehicle communication unit 23, and an I/O I/F 24. The onboard update apparatus 2 acquires, from the first outside-vehicle communication apparatus 1*a*, the update program received by the first outside-vehicle communication apparatus 1*a* from the external server 100 via wireless communication. The onboard update apparatus 2 is configured to transmit the update program via the in-vehicle LAN 4 to a predetermined onboard ECU 3 (target onboard ECU 3 for updating). The onboard update apparatus 2, for example, is a gateway (relay device) that controls segments of a plurality of systems, such as the onboard ECU 3 of a control system, the onboard ECU 3 of a safety system, the onboard ECU 3 of a body system, and the like and relays communications between the onboard ECUs 3 of these segments. Also, the onboard update apparatus 2 may be configured as a functional unit of the body ECU that controls the entire vehicle C.

The control unit 20 is constituted by a central processing unit (CPU), an MPU, or the like and executes various types of control processing and calculation processing by reading out and executing a control program 211 and data stored in advance in the storage unit 21.

The target onboard ECU 3 for updating adopting the control program 211 is controlled by the control unit 20 executing the control program 211 stored in the storage unit 21. By the control unit 20 executing the control program 211 stored in the storage unit 21, the control unit 20 functions as an acquisition unit that acquires the information relating to canceling the update program. By the control unit 20 executing the control program 211 stored in the storage unit 21, the control unit 20 functions as a communication attempt unit that attempts to communicate with the external server 100 when the update program is adopted by the target onboard ECU 3 for updating. By the control unit 20 executing the control program 211 stored in the storage unit 21, the control unit 20 functions as a first output unit that outputs confirmation screen data constituting a confirmation screen for confirming whether or not the update program needs to be adopted when adopting the update program to the target onboard ECU 3 for updating. By the control unit 20 executing the control program 211 stored in the storage unit 21, the control unit 20 functions as a second output unit that outputs notification screen data constituting a notification screen for reporting the cancelation of adoption of the update program on the target onboard ECU 3 for updating.

The storage unit 21 is constituted by a volatile memory element such as RAM or a non-volatile memory element, such as ROM, electrically erasable programmable ROM (EEPROM), flash memory, or the like. The control program 211 and the identification information 212 are stored in advance in the storage unit 21. The control program 211 stored in the storage unit 21 may be the control program 211 read out from a storage medium 22 readable by the onboard update apparatus 2. Also, the control program 211 may be the control program 211 downloaded from a non-illustrated external computer connected to a non-illustrated communication network and stored in the storage unit 21. The identification information 212 is information used to identify the portable terminal 8 when the onboard update apparatus 2 and the portable terminal 8 communicate and is the phone number of the portable terminal 8, for example. More details are described below. History information 213 is stored in the storage unit 21. In the history information 213, information indicating that the update program has been adopted by the target onboard ECU 3 for updating and information relating to the success or failure of communication with the external server 100 upon adoption of the update program are associated together and stored. The storage unit 21 corresponds to a predetermined storage area in the vehicle C. The predetermined storage area in the vehicle C is not limited to the storage unit 21 and may be a storage unit constituted by a storage unit 31 of the onboard ECU 3 described below or a non-illustrated non-volatile memory in the vehicle C, for example.

The in-vehicle communication unit 23 is an I/O interface that uses a communication protocol, such as CAN (registered trademark), Ethernet (registered trademark), or the like. The control unit 20 communicates with the onboard ECU 3 connected to the in-vehicle LAN 4 via the in-vehicle communication unit 23 or an onboard device of another relay apparatus or the like. A plurality (three in the diagram) of the in-vehicle communication units 23 are provided. A communication line constituting the in-vehicle LAN 4 is connected to each one of the in-vehicle communication units 23. By providing a plurality of the in-vehicle communication units 23 in this manner, the in-vehicle LAN 4 can be divided in a plurality of segments. The onboard ECU 3 connects to the segment in accordance with the function (control system function, safety system function, body system function) of the onboard ECU 3.

As with the I/O I/F of the first outside-vehicle communication apparatus 1a and the I/O I/F of the second outside-vehicle communication apparatus 1b, the I/O I/F 24 is a communication interface for serial communication, for example. The onboard update apparatus 2 communicates with the first outside-vehicle communication apparatus 1a, the second outside-vehicle communication apparatus 1b, the display apparatus 5, the IG switch 6, and the input apparatus 7 via the I/O I/F 24.

The display apparatus 5 is a human machine interface (HMI) apparatus such as a car navigation display, for example. The input apparatus 7 is a car navigation touch panel, for example. The display apparatus 5 and the input apparatus 7 are communicatively connected to the I/O I/F 24 of the onboard update apparatus 2 via a harness such as a serial cable or the like. Data or information output from the control unit 20 of the onboard update apparatus 2 via the I/O I/F 24 is displayed on the display apparatus 5. The input apparatus 7 receives input from an occupant of the vehicle C, for example, the operator of the vehicle C, and outputs the input result to the control unit 20 via the I/O I/F 24. The mode of connection between the display apparatus 5 and the input apparatus 7 and the onboard update apparatus 2 is not limited to being connected via the I/O I/F 24, and the display apparatus 5 and the input apparatus 7 and the onboard update apparatus 2 may be connected via the in-vehicle LAN 4.

The IG switch 6 is a switch for switching between operation states of the prime mover (not illustrated) such as the engine of the vehicle C. For example, the operator of the vehicle C switches the IG switch 6 from off to on to activate the vehicle C and start driving the vehicle C. Then, when the operator of the vehicle C has finished driving the vehicle C, the operator switches the IG switch 6 from on to off and stops the vehicle C. The IG switch 6 is communicatively connected to the I/O I/F 24 of the onboard update apparatus 2 via a harness such as a serial cable or the like. The switch state (on or off) of the IG switch 6 is reported to the control unit 20 of the onboard update apparatus 2 via the I/O I/F 24. For example, a signal indicating whether the IG switch 6 is on or off is input from the IG switch 6 to the control unit 20 of the onboard update apparatus 2 via the I/O I/F 24. The mode of connection between the IG switch 6 and the onboard update apparatus 2 is not limited to being connected via the I/O I/F 24, and the IG switch 6 and the onboard update apparatus 2 may be connected via the in-vehicle LAN 4.

The onboard ECU 3 includes a control unit 30, the storage unit 31, and an in-vehicle communication unit 32. The storage unit 31 is constituted by a volatile memory element such as RAM or a non-volatile memory element, such as ROM, EEPROM, flash memory, or the like. A program or data of the onboard ECU 3 is stored in the storage unit 31. The program or data is the target for updating by the update program transmitted from the onboard update apparatus 2.

The storage unit 31 may include a first storage area (first surface) and a second storage area (second surface). In this case, two programs, a program (current version) currently executed (adopted) by the onboard ECU 3 and a program (previous version) adopted prior to the current version, are stored in the storage unit 31. The current version of the program and the previous version of the program are divided between the storage areas, i.e., the first storage area and the second storage area, and stored. In other words, in a case where the current version of the program is stored in the first storage area, the previous version of the program is stored in the second storage area. In a case where the previous version of the program is stored in the first storage area, the current version of the program is stored in the second storage area. In a case where the storage unit 31 includes the first storage area and the second storage area, the two programs, i.e., the current version of the program and the previous version of the program, are stored in the form of a so-called "two region storage". Accordingly, even in a case where a problem occurs in the current version of the program, the control unit 30 loads the previous version of the program adopted previously that operated normally and executes (switches to) the program. This allows the reliability of the onboard ECU 3 to be ensured. Hereinafter, a case in which the storage unit 31 includes the first storage area and the second storage area is referred to as the storage unit 31 having two region storage, and a case in which the storage unit 31 includes either the first storage area or the second storage area is referred to as the storage unit 31 having one region storage.

In a case where the storage unit 31 has two region storage, information relating to the versions of the two programs, i.e., the current version and the previous version, and information relating to the area (operation region) storing the program currently being executed (adopted) are stored in the storage unit 31. In other words, in a case where the program stored in the first storage area is currently being executed, the storage unit 31 uses the first storage area as the operation region. In a case where the program stored in the second storage area is currently being executed, the storage unit 31 uses the second storage area as the operation region. Program version (current version and previous version) information and information relating to the operation region are stored in the storage unit 31.

The control unit 30 is constituted by a CPU, an MPU, or the like. The control unit 30 reads out and executes a program and data stored in the storage unit 31 (in a case where the storage unit 31 has two region storage, the operation region of the storage unit 31), executes control processing and the like, and controls the onboard device, actuator, or the like including the onboard ECU 3.

The control unit 30 of the onboard ECU 3 receives the update program transmitted from the onboard update apparatus 2 via the in-vehicle communication unit 32 and acquires the update program. In a case where the storage unit 31 has one region storage, the update program is adopted by the control unit 30 storing the acquired update program in the storage unit 31. For the update program transmitted from the onboard update apparatus 2 to be acquired, the control unit 30, as part of processing to prepare for acquisition, deletes the program (current version of the program) stored in the storage unit 31. To delete the program, the control function of the onboard ECU 3 with respect to the onboard apparatus must be stopped. In a case where the storage unit 31 has two region storage, the control unit 30 stores the acquired update program in the storage area which is not the operation region (non-operation region). In other words, for the update program transmitted from the onboard update apparatus 2 to be acquired, the control unit 30, as part of processing to prepare for acquisition, deletes the program stored in the non-operation region. Typically, the program stored in the non-operation region is the previous version of the program executed prior to the current version of the program. Accordingly, without stopping the control function of the onboard ECU 3 with respect to the onboard apparatus, the control unit 30 deletes the previous version of the program and stores the update program transmitted from the onboard update apparatus 2 in the non-operation region. By the control unit 30 switching between the operation region and the non-operation region of the storage unit 31, the received (stored) update program is adopted as the current version of the program.

The portable terminal 8 is a portable computer, such as a smart phone, a mobile phone, a tablet terminal, or the like and is carried by the occupant of the vehicle C. The portable terminal 8 is capable of communicating with the onboard update apparatus 2 via the second outside-vehicle communication apparatus 1b as described above and always connects to the onboard update apparatus 2. Communication between the portable terminal 8 and the onboard update apparatus 2 may be performed via a wired connection between the portable terminal 8 and the onboard update apparatus 2. When the portable terminal 8 and the onboard update apparatus 2 communicate, the onboard update apparatus 2 confirms whether or not the identification information 212, for example, the phone number of the portable terminal 8, of the portable terminal 8 stored in advance in the storage unit 21 matches the identification information 212 of the portable terminal 8 performing communicating. In other words, the onboard update apparatus 2 authenticates the portable terminal 8. In a case where the identification information 212 is a match (authentication is successful), the onboard update apparatus 2 continues communication with the portable terminal 8. The portable terminal 8 and the onboard update apparatus 2 are paired (have established authenticated communication). In a case where the identification information 212 is not a match (authentication fails), the onboard update apparatus 2 cancels communication with the portable terminal 8. By pairing the onboard update apparatus 2 and the portable terminal 8, the validity of the portable terminal 8 which is the pairing target can be confirmed on the basis of the identification information 212 and the security of the pairing between the onboard update apparatus 2 and the portable terminal 8 can be ensured. The identification information 212 is not limited to the phone number of the portable terminal 8. The identification information 212 may be a user identification (ID) of a program (application) executed by the portable terminal 8 when communicating with the onboard update apparatus 2, for example.

The identification information 212 is stored in the storage unit 21 via operation of the portable terminal 8 or input to the input apparatus 7 by the occupant of the vehicle C carrying the portable terminal 8 when purchasing the vehicle C or when changing the portable terminal 8, for example. When the identification information 212 is stored in the storage unit 21, the onboard update apparatus 2 transmits the vehicle identification number of the vehicle C and the stored identification information 212 to the external server 100. The vehicle identification number and the identification information 212 received by the external server 100 are associated together and stored as the vehicle DB 111 in the storage unit 110 of the external server 100. The storage unit 110 corresponds to the storage area able to be referenced by the external server 100. The storage area able to be referenced by the external server 100 is not limited to the storage unit 110 and may be a storage unit constituted by the non-volatile memory of a non-illustrated computer that the external server 100 is capable of communicating with, for example.

The authentication (pairing between the portable terminal 8 and the onboard update apparatus 2) of the portable terminal 8 is automatically performed when the people carrying the portable terminal 8 enters the vehicle C, for example. The authentication of the portable terminal 8 may be performed via an operation of the portable terminal 8 or an input to the input apparatus 7 by the person carrying the portable terminal 8. The pairing of the portable terminal 8 and the onboard update apparatus 2 may include not only authentication of the portable terminal 8 by the onboard update apparatus 2, but also authentication of the onboard update apparatus 2 (the vehicle C) by the portable terminal 8. In this case, the vehicle identification number of the vehicle C is stored in a storage unit constituted by a non-illustrated non-volatile memory of the portable terminal 8. When the portable terminal 8 communicates with the onboard update apparatus 2, for example, the portable terminal 8 confirms whether or not the vehicle identification number stored in advance in the storage unit 21 matches the vehicle identification number stored in the storage unit of the portable terminal 8 and performs authentication of the onboard update apparatus 2.

Furthermore, the portable terminal 8 is capable of communicating with the external server 100 via the outside-vehicle network N. The onboard update apparatus 2 and the external server 100 are capable of communicating with one another via the portable terminal 8 and the outside-vehicle network N. For communications, the external server 100 references the vehicle DB 111 stored in the storage unit 110 and confirms whether or not the identification information 212 of the portable terminal 8 and the vehicle identification number of the vehicle C performing communication are associated together and stored. In other words, the external server 100 authenticates the vehicle C and the portable terminal 8. In a case where the vehicle identification number of the vehicle C and the identification information 212 of the portable terminal 8 are associated together and stored (authentication is successful), the external server 100 continues communicating with the onboard update apparatus 2 via the portable terminal 8 and the outside-vehicle network N. In a case where the vehicle identification number of the vehicle C and the identification information 212 of the portable terminal 8 are not associated together and stored (authentication fails), the external server 100 cancels communicating with the portable terminal 8 and ends communications with the onboard update apparatus 2. In a case where the external server 100 has been communicating with the onboard update apparatus 2 via the portable terminal 8, the validity of the portable terminal 8 can be determined on the basis of a combination of the vehicle identification number of the vehicle C installed with the onboard update apparatus 2 and the identification information 212 of the portable terminal 8. This allows the security of the communication between the external server 100 and the onboard update apparatus 2 via the portable terminal 8 to be ensured.

The identification information 212 of a plurality of the portable terminals 8 may be stored in the storage unit 21 of the onboard update apparatus 2. In this case, a priority order for communication with the external server 100 is assigned to the plurality of pieces of identification information 212. For example, an identification information table in which the identification information 212 of the plurality of portable terminals 8 and the priority order for communication via the portable terminals 8 are associated together and stored is stored in the storage unit 21. FIG. 3 is a conceptual diagram indicating an example of the contents of the identification information table. In the identification information table of FIG. 3, the identification information 212 of two portable terminals 8 and the priority order for communication via the portable terminals 8 are associated together and stored.

The priority order for communication, for example, is assigned via an operation of the portable terminal 8 or an input to the input apparatus 7 by the occupant of the vehicle C carrying the portable terminal 8 when storing the identification information 212 in the storage unit 21. In this case, the vehicle number of the vehicle C and a plurality of pieces of the identification information 212 are associated together and stored in the storage unit 110 of the external server 100 as the vehicle DB 111. The onboard update apparatus 2 attempts to communicate with the external server 100 via the portable terminals 8 on the basis of the priority order. In a case where two pieces of identification information 212 are stored in the storage unit 21 and communication with the external server 100 is performed via the portable terminals 8, the onboard update apparatus 2 first attempts to communicate with the external server 100 via the portable terminal 8 highest in the priority order. In a case where communication with the external server 100 via the portable terminal 8 with the highest priority order has failed, for example if the portable terminal 8 with the highest priority order is out of range, the onboard update apparatus 2 attempts to communicate with the external server 100 via the portable terminal 8 with the second highest priority order. By performing communication on the basis of the priority order, simultaneously establishing a plurality of communications with the external server 100 via the plurality of portable terminals 8 can be prevented. This can also prevent congestion between the onboard update apparatus 2 and the external server 100.

Figure 4:
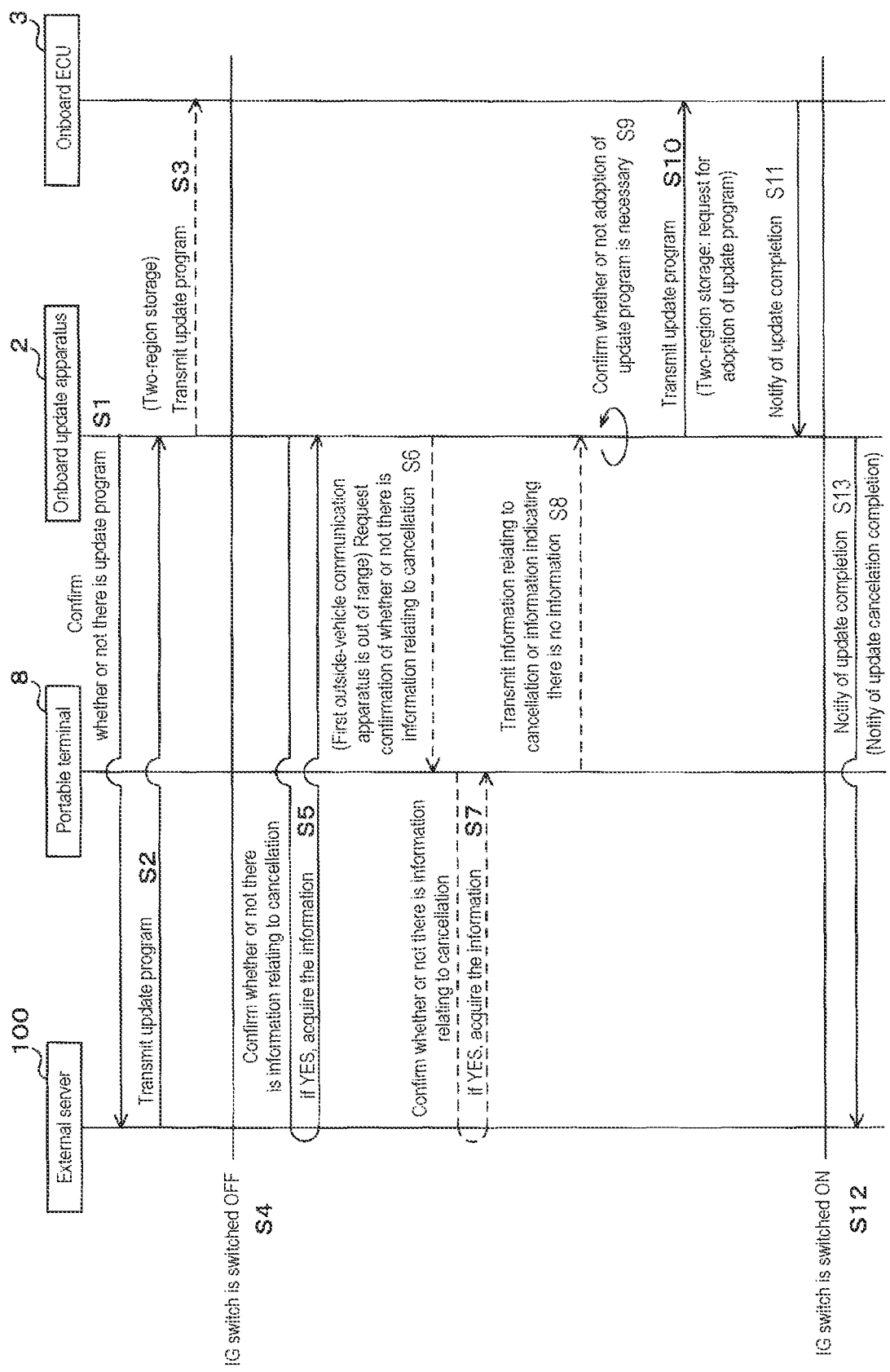
FIG. 4 is an explanatory diagram (sequence diagram) illustrating a mode of updating a program of a target onboard ECU for updating via the onboard update apparatus.

FIG. 4 is an explanatory diagram (sequence diagram) illustrating a mode of updating the program of the target onboard ECU 3 for updating via the onboard update apparatus 2. FIG. 4 is a sequence diagram illustrating processing by the onboard update apparatus 2 to update the program of the target onboard ECU 3 for updating and includes processing by the external server 100, the onboard ECU 3, and the portable terminal 8. In this example of program updating, the update program is transmitted from the external server 100. Hereinafter, the term "step" is abbreviated to "S".

In a case where the vehicle C is activated (the IG switch 6 is on), the onboard update apparatus 2 periodically or non-periodically communicates with the external server 100 via the first outside-vehicle communication apparatus 1a. The onboard update apparatus 2 confirms whether or not the program or data, i.e., the update program for updating is prepared in the external server 100. In other words, the onboard update apparatus 2 confirms whether or not there is an update program (S1).

In a case where the update program is prepared in the external server 100, the external server 100 transmits the update program to the onboard update apparatus 2 (S2). The onboard update apparatus 2 acquires the update program from the external server 100 and stores the update program in a predetermined storage area in the vehicle C. In a case where the storage unit 31 of the target onboard ECU 3 for updating has one region storage, the acquired update program is stored (saved) in the storage unit 21 of the onboard update apparatus 2. In a case where the storage unit 31 of the target onboard ECU 3 for updating has two region storage, the onboard update apparatus 2 transmits the acquired update program to the target onboard ECU 3 for updating (S3). The transmitted update program is stored (saved) in the non-operation region of the storage unit 31 of the onboard ECU 3.

In a case where the IG switch 6 is switched to off (S4), the onboard update apparatus 2 attempts to communicate with the external server 100. Specifically, the onboard update apparatus 2 first attempts to communicate with the external server 100 via the first outside-vehicle communication apparatus 1a. In a case where the onboard update apparatus 2 successfully communicates with the external server 100 via the first outside-vehicle communication apparatus 1a, the following processing is executed. The onboard update apparatus 2 confirms whether or not (whether or not information relating to cancelation is prepared) there is information relating to canceling the transmitted update program in the external server 100 and, in a case where there is information relating to cancelation, acquires the information relating to cancelation (S5). In a case where the onboard update apparatus 2 fails to communicate with the external server 100 via the first outside-vehicle communication apparatus 1a, the onboard update apparatus 2 attempts to communicate with the external server 100 via the second outside-vehicle communication apparatus 1b and the portable terminal 8.

In a case where communication with the external server 100 via the first outside-vehicle communication apparatus 1a has failed, for example, if the first outside-vehicle communication apparatus 1a is out of range, the onboard update apparatus 2 sends a request to the paired portable terminal 8 to confirm whether or not there is the information relating to cancelation in the external server 100 (S6). The portable terminal 8 confirms whether or not there is the information relating to cancelation in the external server 100 and, in a case where there is the information relating to cancelation, acquires the information relating to cancelation (S7). When the portable terminal 8 and the external server 100 communicate, authentication of the vehicle C and the portable terminal 8 is performed by the external server 100 as described above. In a case where the portable terminal 8 acquires the information relating to cancelation, the information relating to cancelation is transmitted to the onboard update apparatus 2. In a case where the information relating to cancelation is not prepared in the external server 100, the portable terminal 8 transmits information indicating that there is no information relating to cancelation to the onboard update apparatus 2 (S8).

When confirming whether or not there is the information relating to cancelation, in a case where the information relating to cancelation is not prepared in the external server 100, the onboard update apparatus 2 executes the following processing. Note that in the confirmation of whether or not there is the information relating to cancelation, a case where the information relating to cancelation is not prepared in the external server 100 corresponds to a case where communication between the onboard update apparatus 2 and the external server 100 is successful but the information relating to cancelation cannot be acquired. The onboard update apparatus 2 outputs the confirmation screen data constituting the confirmation screen for confirming whether or not the update program needs to be adopted (accepted). The details of this are described below. The onboard update apparatus 2 confirms with the occupant of the vehicle C whether or not the update program needs to be adopted by outputting the confirmation screen data (S9). At the confirmation screen, in a case where an input indicating that adoption is necessary is received (a case where adoption is necessary is input), the onboard update apparatus 2 adopts the stored update program for the target onboard ECU 3 for updating. Specifically, in a case where the storage unit 31 of the target onboard ECU 3 for updating has one region storage, the onboard update apparatus 2 transmits the stored update program to the target onboard ECU 3 for updating (S10). The transmitted update program is stored in the storage unit 31 and adopted by the target onboard ECU 3 for updating.

In a case where the storage unit 31 of the target onboard ECU 3 for updating has two region storage, the update program is stored in the non-operation region of the storage unit 31. Thus, the onboard update apparatus 2 sends a request to the target onboard ECU 3 for updating to switch between the operation region and the non-operation region of the storage unit 31. By the target onboard ECU 3 for updating switching from the operation region between the non-operation region of the storage unit 31, the update program is adopted. In other words, in a case where the storage unit 31 has two region storage, the onboard update apparatus 2 sends a request to the target onboard ECU 3 for updating to adopt the update program.

The target onboard ECU 3 for updating notifies the onboard update apparatus 2 of the completion of the adoption of the update program, i.e., that the updating of its program has been completed (S11). The onboard update apparatus 2 may send a request to the target onboard ECU 3 for updating to reset (restart). Next, when the IG switch 6 is switched to on, the target onboard ECU 3 for updating can reliably activate.

In confirming whether or not there is the information relating to cancelation, in a case where there is the information relating to cancelation prepared in the external server 100, in other words the information relating to cancelation has been acquired, the onboard update apparatus 2 cancels the adoption of the update program by the target onboard ECU 3 for updating. In other words, the onboard update apparatus 2 cancels the update of the program of the onboard ECU 3. Note that in the confirmation of whether or not there is the information relating to cancelation, a case where the information relating to cancelation is prepared in the external server 100 corresponds to a case where communication between the onboard update apparatus 2 and the external server 100 is successful but the information relating to cancelation can be acquired.

The onboard update apparatus 2 executes processing for deleting the stored update program instead of the processing of S9. The processing of S10 and S11 are omitted. In a case where the storage unit 31 of the target onboard ECU 3 for updating has one region storage, the onboard update apparatus 2 deletes the update program stored (saved) in the storage unit 21. In a case where the storage unit 31 of the target onboard ECU 3 for updating has two region storage, the onboard update apparatus 2 sends a request to the target onboard ECU 3 for updating to delete the update program stored (saved) in the non-operation region of the storage unit 31. The target onboard ECU 3 for updating deletes the update program stored in the non-operation region of the storage unit 31 and notifies the onboard update apparatus 2 of the completion of the deletion of the update program.

In a case where the IG switch 6 is switched to on (S12), the onboard update apparatus 2 notifies the external server 100 of the completion of the update of the program of the onboard ECU 3 or the completion of the cancelation of the adoption of the update program, i.e., that canceling the update of the onboard ECU 3 has been completed (S13). This notification may be performed via communication between the onboard update apparatus 2 and the external server 100 via the first outside-vehicle communication apparatus 1a or may be performed via communication between the onboard update apparatus 2 and the external server 100 via the portable terminal 8. In a case where the information relating to cancelation is prepared in the external server 100, the external server 100 may be configured to not transmit the new update program or not send a notification relating to the new update program to the onboard update apparatus 2 until it receives a notification of the update cancelation completion from the onboard update apparatus 2.

Figure 5:
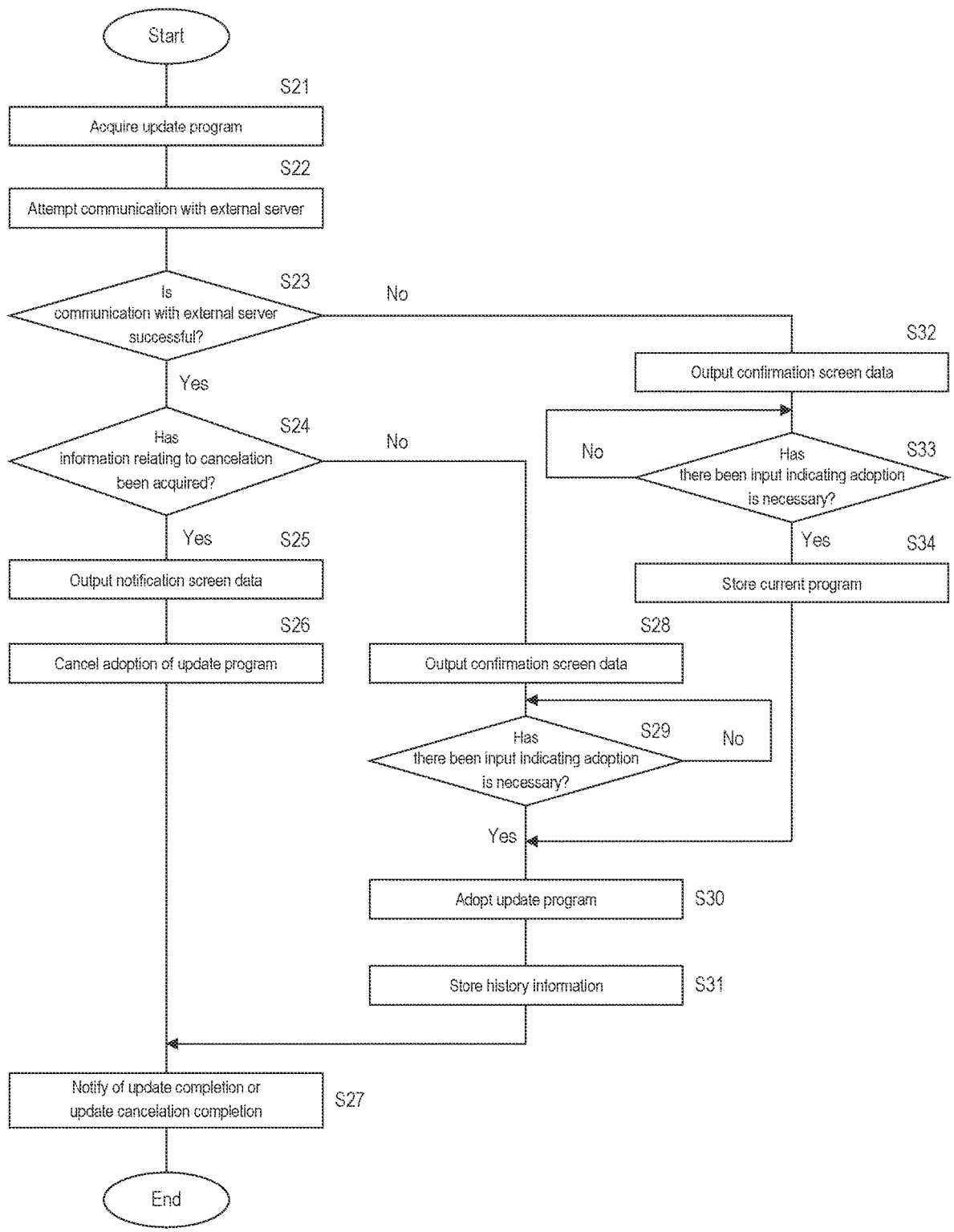
FIG. 5 is a flowchart illustrating an example of a main routine of the processing relating to adopting the update program executed by a control unit of the onboard update apparatus.
Figure 6:
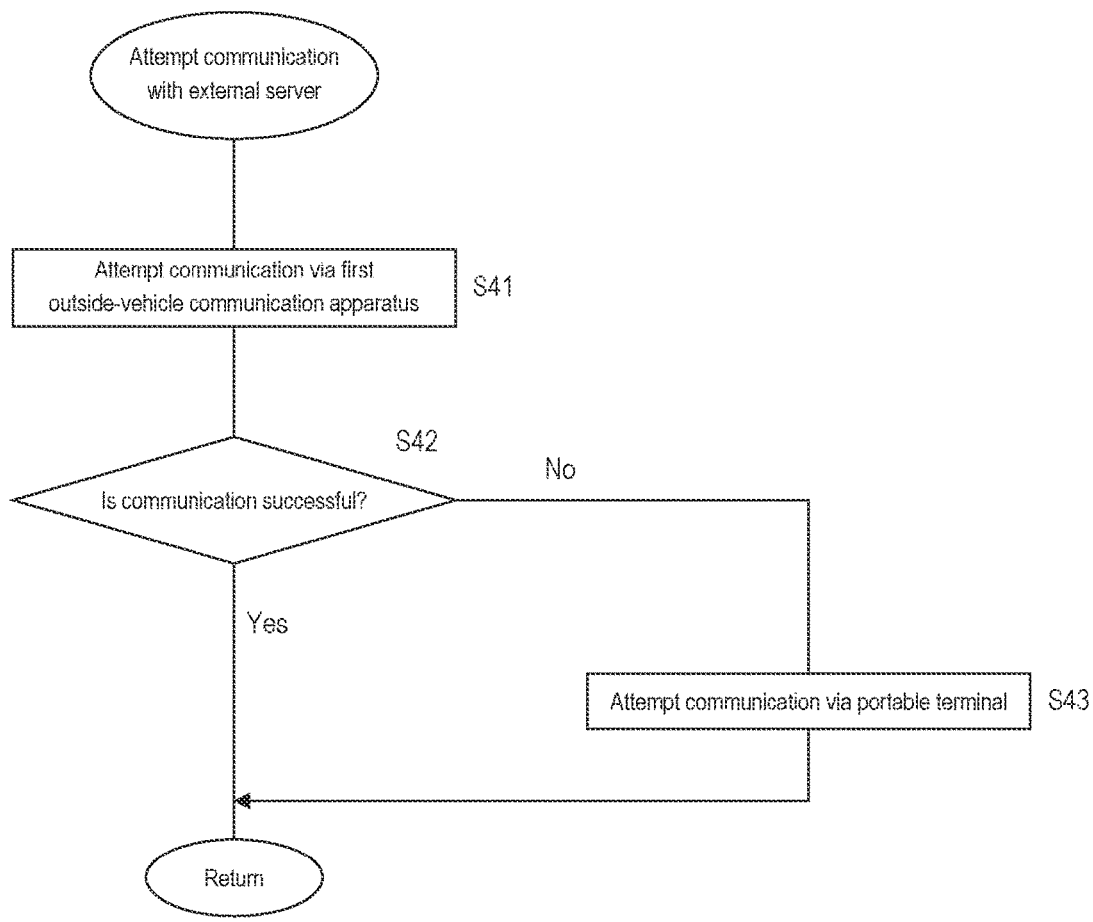
FIG. 6 is a flowchart illustrating an example of the processing process of the control unit relating to a subroutine for attempting communication with an external server.

FIG. 5 is a flowchart illustrating an example of the main routine of the processing relating to adopting the update program executed by the control unit 20 of the onboard update apparatus 2. FIG. 6 is a flowchart illustrating an example of the processing process of the control unit 20 relating to a subroutine for attempting communication with the external server 100. In a case where the vehicle C is activated (the IG switch 6 is on), the control unit 20 of the onboard update apparatus 2 periodically or non-periodically communicates with the external server 100 via the first outside-vehicle communication apparatus 1a. In a case where a program or data to be updated, i.e., the update program, is prepared in the external server 100, the following processing is executed. Alternatively, the control unit 20 may execute the following processing on the basis of an update notification from the external server 100 acquired via the first outside-vehicle communication apparatus 1a. The control unit 20 may execute the following processing on the basis of an update notification being displayed on the display apparatus 5 and consent for update being entered by the operator of the vehicle C via the input apparatus 7.

As illustrated in FIG. 5, the control unit 20 acquires the update program from the external server 100 (S21) and stores the update program in a predetermined storage area in the vehicle C. As described above, the acquired update program is stored (saved) in the storage unit 21 or transmitted to the target onboard ECU 3 for updating and stored (saved) in the non-operation region of the storage unit 31 of the onboard ECU 3.

In a case where the IG switch 6 is switched to off, the control unit 20 calls and executes the subroutine relating to attempting communication with the external server 100 (S22) and attempts to communicate with the external server 100. As illustrated in FIG. 6, the control unit 20 attempts to communicate with the external server 100 via the first outside-vehicle communication apparatus 1a (S41) and determines whether or not communication is successful (S42). In a case where communication with the external server 100 via the first outside-vehicle communication apparatus 1a is successful (yes in S42), the control unit 20 returns to the main routine. In a case where communication with the external server 100 via the first outside-vehicle communication apparatus 1a is not successful (no in S42), for example if the first outside-vehicle communication apparatus 1a is out of range, the control unit 20 attempts to communicate with the external server 100 via the portable terminal 8 (S43) and returns to the main routine. In a case where the identification information 212 of a plurality of the portable terminals 8 are stored in the storage unit 21, in S43, the control unit 20 attempts to communicate with the external server 100 via each of the portable terminals 8 on the basis of the priority order (see FIG. 3) assigned to the identification information 212.

As illustrated in FIG. 5, in a case where the process returns from the subroutine relating to attempting to communicate with the external server 100, the control unit 20 determines whether or not communication with the external server 100 was successful (S23). In a case where communication with the external server 100 was successful (yes in S23), the control unit 20 confirms whether or not (whether or not there is the information relating to cancelation) the information relating to canceling the stored update program is prepared in the external server 100 (S24). In a case where the information relating to cancelation is prepared, the control unit 20 acquires the information relating to cancelation.

In a case where the information relating to cancelation is acquired (the information relating to cancelation is prepared) (yes in S24), the control unit 20 outputs the notification screen data constituting the notification screen for notifying of the cancelation of adoption of the update program by the target onboard ECU 3 for updating (S25) and displays the notification screen on the display apparatus 5. The notification screen data is stored in advance in the storage unit 21, for example. The notification screen data may be included in the acquired information relating to cancelation. By displaying the notification screen on the display apparatus 5, the occupant such as the operator of the vehicle C can be notified of the cancelation of the adoption of the update program by the target onboard ECU 3 for updating (the cancelation of the update of the program of the onboard ECU 3). For example, a message such as "The update has been canceled because there is a problem with the update program" is displayed on the notification screen. The data of this message is included in the notification screen data, for example. The notification screen may include a button for receiving an input indicating consent (consent relating to canceling adoption of the update program) for canceling the update from the operator of the vehicle C. In a case where consent for canceling the update is input, the time when the input for consent was received may be stored in the storage unit 21. This allows traceability relating to updating the program of the onboard ECU 3 to be ensured. The display apparatus 5 may store data relating to the notification screen, for example, image data for displaying the notification screen. In S25, a notification screen signal instructing the display apparatus 5 to display the notification screen is output by the control unit 20 as notification screen data. The display apparatus 5 acquires the output notification screen signal and displays the notification screen. The data relating to the notification screen may be stored in advance in the storage unit 21 at the time of manufacture of the onboard update apparatus 2. Also, in S25, the control unit 20 may output the notification screen to the display apparatus 5 as notification screen data. The display apparatus 5 displays the notification screen output from the control unit 20.

In a case where consent for canceling the update is input or a certain amount of time has elapsed since the output of the notification screen data, the control unit 20 cancels the adoption of the update program (S26). As described above, the onboard update apparatus 2 deletes the update program stored in the storage unit 21 or sends a request to the target onboard ECU 3 for updating to delete the update program stored in the non-operation region of the storage unit 31.

In a case where the IG switch 6 is switched to on, the control unit 20 executes the processing of S27, and the processing ends. The processing of S27 is processing including notifying the external server 100 and the occupant of the vehicle C of the completion of the updating of the program of the onboard ECU 3 or the completion of the cancelation of the update of the program of the onboard ECU 3 by the control unit 20. The notification to the external server 100 of update completion or update cancelation completion may be performed by communication via the first outside-vehicle communication apparatus 1a or performed by communication via the portable terminal 8. In a case where the update is canceled, in other words when adoption of the update program is canceled, the control unit 20 notifies the external server 100 and the occupant of the vehicle C of update cancelation completion. When the external server 100 is notified of update cancelation completion, the time when the input of consent for update cancelation was received stored in the storage unit 21 described above may be transmitted to the external server 100 via the first outside-vehicle communication apparatus 1*a* or the portable terminal 8. The control unit 20, for example, notifies the occupant of the vehicle C of update cancelation completion by displaying a message such as "Cancelation of the update has been completed" on the display apparatus 5. The message is stored in the storage unit 21, for example. An example where the control unit 20 notifies the external server 100 and the occupant of the vehicle C of update completion, in other words an example in which the update has been completed, will be described below.

In a case where the information relating to cancelation has not been acquired (no in S24), in other words the information relating to cancelation has not been prepared, the control unit 20 outputs the confirmation screen data (S28). When the control unit 20 makes the target onboard ECU for updating adopt the stored (saved) update program, the confirmation screen data corresponds to data constituting the confirmation screen for confirming whether or not adoption is needed. The confirmation screen data is stored in advance in the storage unit 21, for example.

The control unit 20 displays the confirmation screen on the display apparatus 5 by outputting the confirmation screen data. For example, a message such as "Executing ECU program update" is displayed on the confirmation screen. The data of this message is included in the confirmation screen data, for example. Also, a button for receiving (confirming whether or not adoption is necessary) an input of consent for update from the occupant of the vehicle C is displayed on the confirmation screen. For example, the occupant of the vehicle C inputs update consent via operation of the input apparatus 7. The control unit 20 determines whether or not there has been an input indicating that adoption is necessary (S29). In a case where update consent has been input, in other words there has been an input indicating that adoption is necessary (yes in S29), the control unit 20 performs adoption of the update program by the target onboard ECU 3 for updating (S30). A case where update consent has been input corresponds to a case where there has been an input indicating that adoption is necessary. In a case where the storage unit 31 of the target onboard ECU 3 for updating has one region storage, the control unit 20 transmits the update program stored in the storage unit 21 to the target onboard ECU 3 for updating. The transmitted update program is stored in the storage unit 31 of the target onboard ECU 3 for updating and adopted by the onboard ECU 3. In a case where the storage unit 31 of the target onboard ECU 3 for updating has two region storage, the control unit 20 sends a request to the target onboard ECU 3 for updating to switch between the operation region and the non-operation region of the storage unit 31. By switching between the operation region and the non-operation region, the update program is adopted by the target onboard ECU 3 for updating. The control unit 20 is notified of the completion (update completion) of the adoption of the update program from the target onboard ECU 3 for updating. The control unit 20 executes the processing of S31 described below.

In a case where update consent has not been input, in other words there has been no input indicating that adoption is necessary (no in S29), loop processing is executed to again execute the processing of S29. In executing loop processing, the control unit 20 may execute standby processing (sleep) for a predetermined amount of time. In a case where there is no input indicating that adoption is necessary for a certain amount of time or longer, the control unit 20 may end the processing.

In S22 when communication between the control unit 20 and the external server 100 is attempted, in a case where the control unit 20 is unsuccessful in communicating with the external server 100 (no in S23), the update program is adopted by the target onboard ECU 3 for updating. Note that a case where communication with the external server 100 is unsuccessful, specifically in a case where both communication via the first outside-vehicle communication apparatus 1*a* and communication via the portable terminal 8 has failed, is referred to hereinafter as a case where the communication with the external server 100 has failed. A case where communication with the external server 100 has failed corresponds to a case where both the first outside-vehicle communication apparatus 1*a* and the portable terminal 8 are out of range, for example. In a case where communication (connection) with the external server 100 cannot be established in a certain amount of time or longer, for example, the control unit 20 may determine that communication with the external server 100 has failed.

In a case where communication with the external server 100 has failed, the control unit 20 outputs confirmation screen data different from the confirmation screen data output in S28 described above (S32) and displays the confirmation screen on the display apparatus 5. In other words, the confirmation screen data output and the confirmation screen displayed are different in a case where communication with the external server 100 is successful and in a case where communication with the external server 100 has failed. In a case where communication with the external server 100 has failed, a message such as "Executing ECU program update" and a button for receiving input for update consent are displayed on the confirmation screen as described above, for example, and a message such as the following messages is also displayed. For example, a message indicating that it is out of communication range and that whether or not there is the latest information relating to cancelation (latest update cancelation information) cannot be confirmed at this point in time is displayed on the confirmation screen. Specifically, a message such as "Out of communication range. The latest update cancelation information cannot be confirmed" is displayed on the confirmation screen. A message indicating the execution of backing up described below, for example a message such as "Upon updating, the current program will be backed up", may be displayed on the confirmation screen. These messages are included in the confirmation screen data and stored in advance in the storage unit 21, for example. Aside from a message, a mark indicating out of communication range may be displayed on the confirmation screen, for example. The color of the confirmation screen (the confirmation screen in a case where communication with the external server 100 is successful) relating to S28 and the color of the confirmation screen (the confirmation screen in a case where communication with the external server 100 has failed) relating to S32 may be different. For example, the confirmation screen relating to S28 may be blue, and the confirmation screen relating to S32 may be yellow. By outputting different confirmation screen data for S28 and S32, the person, such as the operator of the vehicle C or the like, who confirms whether or not the update program needs to be adopted can be provided with the appropriate information, such as the communication status with the external server 100, that the latest update cancelation information is unconfirmed, and the like.

The display apparatus 5 may store data relating to the confirmation screen, examples including a plurality of pieces of image data for displaying the confirmation screens (the image data for displaying the confirmation screen relating to S28 and the image data for displaying the confirmation screen relating to S32). In this case, in S32, the control unit 20 outputs a confirmation screen signal as confirmation screen data instructing the display apparatus 5 to display the confirmation screen relating to S32. The display apparatus 5 acquires the output confirmation screen signal and displays the confirmation screen relating to S32. In S28 described above, the control unit 20 outputs a confirmation screen signal as confirmation screen data instructing the display apparatus 5 to display the confirmation screen relating to S28. The display apparatus 5 acquires the output confirmation screen signal and displays the confirmation screen relating to S28. The data relating to the confirmation screen may be stored in advance in the storage unit 21 at the time of manufacture of the onboard update apparatus 2. In S32, for example, the control unit 20 selects the image data for displaying the confirmation screen relating to S32 from the plurality of pieces of image data for displaying the confirmation screens and outputs the selected image data to the display apparatus 5. The display apparatus 5 acquires the output image data and displays the confirmation screen relating to S32. In S28 described above, for example, the control unit 20 selects the image data for displaying the confirmation screen relating to S28 from the plurality of pieces of image data for displaying the confirmation screens and outputs the selected image data to the display apparatus 5. The display apparatus 5 acquires the output image data and displays the confirmation screen relating to S28. Also, in S28 and S32, the control unit 20 may output the confirmation screen as confirmation screen data to the display apparatus 5. The display apparatus 5 displays the confirmation screen output from the control unit 20.

As in the processing of S29, the control unit 20 determines whether or not there has been an input indicating that adoption is necessary (S33). In a case where there is no input indicating the adoption is necessary (no in S33), processing similar to that executed in the case of no in S29 described above is executed. Thus, the description of a case where there is no input indicating the adoption of necessary will be omitted. In a case where there is an input indicating that adoption is necessary (yes in S33), in other words a case where an input indicating that adoption is necessary has been made, the control unit 20 stores the program (current program) at the current point in time of the target onboard ECU 3 for updating (S34). In other words, the control unit 20 backs up the current program of the target onboard ECU 3 for updating. The current program is stored in the storage unit 21 of the onboard update apparatus 2, for example. The control unit 20 executes the processing of S30. In other words, the control unit 20 makes the target onboard ECU 3 for updating adopt the update program.

After the update program is adopted, the control unit 20 stores the history information 213 (S31). The history information 213 is stored (saved) in the storage unit 21, for example. In the history information 213, information indicating that the update program has been adopted by the target onboard ECU 3 for updating and information relating to the success or failure of communication with the external server 100 upon adoption of the update program are associated together and stored. The information indicating that the update program has been adopted by the target onboard ECU 3 for updating includes, for example, an identification number of the target onboard ECU 3 for updating and a name (version) of the adopted update program. The information indicating that the update program has been adopted by the target onboard ECU 3 for updating may further include the input time of the update consent and the completion time of the update, and example including the time of notification from the onboard ECU 3 of update completion. In addition to information indicating the success or failure of communication, the information relating to success or failure of communication with the external server 100 upon adoption may include, in the case of communication success, information indicating that the communication is via the first outside-vehicle communication apparatus 1*a* or via the portable terminal 8. Also, in a case where the communication is via the portable terminal 8, the identification information 212 of the used portable terminal may be included. By storing the history information 213, traceability relating to updating the program of the onboard ECU 3 can be ensured.

In a case where the IG switch 6 is switched to on, the control unit 20 executes the processing of S27, and the processing ends. In S27, in a case where update of the program of the onboard ECU 3 is complete, in other words the adoption of the update program is complete, the control unit 20 notifies the external server 100 and the occupant of the vehicle C of update completion. The control unit 20, for example, notifies the occupant of the vehicle C of update completion by displaying a message such as "The update has been completed" on the display apparatus 5. The message is stored in the storage unit 21, for example. When the external server 100 is notified of update completion, the history information 213 or a portion of the history information 213 such as the completion time of the update may be transmitted to the external server 100 via the first outside-vehicle communication apparatus 1*a* or the portable terminal 8.

In S23, in a case where communication with the external server 100 has failed, when the external server 100 is notified of update completion, the control unit 20 confirms whether or not the information relating to cancelation of the adopted update program is prepared in the external server 100. In a case where the information relating to cancelation is prepared, the control unit 20 acquires the information relating to cancelation and executes the following processing. In a case where the storage unit 31 of the target onboard ECU 3 for updating has one region storage, the control unit 20 transmits the pre-update program (current program in S34) stored in S34, in other words the program corresponding to the version prior to the update program, to the target onboard ECU 3 for updating. The transmitted pre-update program is stored in the storage unit 31 of the onboard ECU 3 and adopted by the onboard ECU 3. In a case where the storage unit 31 of the target onboard ECU 3 for updating has two region storage, the pre-update program is stored in the first storage area or the second storage area (non-operation region) of the storage unit 31. The control unit 20 sends a request to the target onboard ECU 3 for updating to switch between the operation region and the non-operation region. By switching between the operation region and the non-operation region, the pre-update program is adopted by the target onboard ECU 3 for updating. In a case where the storage unit 31 of the target onboard ECU 3 for updating has two region storage, the processing of S34 is omitted. At the point in time when the update program is adopted, in a case where whether or not there is the information relating to cancelation of the update program cannot be confirmed, processing is executed to store the current program of the target onboard ECU 3 for updating. When the information relating to cancelation of the update program adopted by the target onboard ECU 3 for updating is acquired after adoption, rollback processing can be executed using the stored current program.

After the update program is stored in a predetermined storage area, the onboard update apparatus 2 attempts to communicate with the external server 100 to confirm whether or not the information relating to cancelation of the update program is prepared in the external server 100. In a case where a problem is found in the already stored update program and the information relating to cancelation of the update program is prepared in the external server 100, the information relating to cancelation can be acquired.

In a case where communication with the external server 100 is successful and the information relating to cancelation of the stored update program can be acquired, the onboard update apparatus 2 cancels the adoption of the update program. Also, in a case where the information relating to cancelation of the acquired update program cannot be acquired, the update program is adopted. The update program relating to the information relating to cancelation can be prevented from being adopted by the target onboard ECU 3 for updating.

In a case where communication with the external server 100 is successful and the external server 100 is notified of update completion, the onboard update apparatus 2 may confirm whether or not the information relating to cancelation of the adopted update program is prepared in the external server 100. In a case where the information relating to cancelation is prepared and the storage unit 31 of the target onboard ECU 3 for updating has two region storage, the onboard update apparatus 2 executes rollback processing as described above. In a case where the storage unit 31 has one region storage, for example, the pre-update program is transmitted from the external server 100 to the onboard update apparatus 2. The transmitted pre-update program is transmitted to the target onboard ECU 3 for updating by the onboard update apparatus 2 and adopted by the onboard ECU 3. As in the case where communication with the external server 100 has failed, when the update program is adopted, the pre-update program may be stored. The update program relating to the information relating to cancelation can be effectively prevented from being adopted by the target onboard ECU 3 for updating.

In a case where communication with the external server 100 by the onboard update apparatus 2 has failed, the stored update program is adopted by the target onboard ECU 3 for updating. Even in a case where a non-communicative state with the external server 100 continues, by adopting the update program, the program used by the target onboard ECU 3 for updating can be appropriately set.

The embodiments disclosed herein are examples in all respects and should not be interpreted as limiting in any manner. The scope of the present invention is defined not by the foregoing description, but by the scope of the claims, and all modifications that are equivalent to or within the scope of the claims are included.

The invention claimed is:

1. An onboard update apparatus disposed in an automotive vehicle, configured to receive a communication from a first communication apparatus and a second communication apparatus, the first communication apparatus configured to communicate with an external server and the second communication apparatus configured to communicate with a portable terminal, the onboard update apparatus comprising:

a control unit configured to determine an adoption of an update program by an onboard electronic control unit installed in a vehicle, wherein the control unit communicates, through one of the first communication apparatus and the second communication apparatus with an external server outside of the vehicle when a target onboard electronic control unit for updating adopts the update program stored in a predetermined storage area in the vehicle; and an adoption of the update program by the target onboard electronic control unit for updating is canceled in response to: (1) a communication with the external server being successful; and (2) information relating to cancelation of the update program is acquired; and the target onboard electronic control unit for updating adopts the update program in response to (1) the information relating to cancelation cannot be acquired; and (2) communication with the external server has failed; and an identification information for identifying the portable terminal is stored in the predetermined storage area in the vehicle;

the identification information is associated with a vehicle identification number of the vehicle and stored in a storage area to which the external server is capable of referencing; and the control unit establishes communication with the portable terminal on the basis of the identification information; and wherein a plurality of pieces of the identification information for identifying the portable terminal is assigned with a priority order for communication with the external server are stored in the predetermined storage area in the vehicle; and communication with the external server via the portable terminal is performed by the control unit on the basis of the priority order.

2. The onboard update apparatus according to claim 1, wherein when the update program is adopted by the target onboard electronic control unit for updating, the control unit outputs confirmation screen data constituting a confirmation screen for confirming whether or not adoption is necessary;

the update program is adopted by the target onboard electronic control unit for updating when there is an input indicating that adoption is necessary at the confirmation screen; and the confirmation screen data output is different in a case where the information relating to cancelation is not acquired and in a case where communication with the external server has failed.

3. The onboard update apparatus according to claim 1, the control unit outputs notification screen data constituting a notification screen for notifying of cancelation of adoption of the update program by the target onboard electronic control unit for updating when the information relating to cancelation is acquired.

4. The onboard update apparatus according to claim 1, the control unit stores a current program of the target onboard electronic control unit for updating when the target onboard electronic control unit for updating adopts the update program when the communication with the external server has failed.

5. The onboard update apparatus according to claim 1, the control unit stores, in the predetermined storage area in the vehicle, history information storing information indicating that the target onboard electronic control unit for updating has adopted the update program and information relating to whether or not communication with the external server is successful that are associated together when the target onboard electronic control unit for updating has adopted the update program.

6. A computer program product for updating a vehicle, the computer program product comprising a non-transitory, machine-readable medium storing instructions which, when executed by at least one programmable processor, caused at least one programmable processor to perform operations comprising:
  communicating with an external server outside of the vehicle through a first communication apparatus when a target onboard electronic control unit for updating adopts an update program stored in a predetermined storage area in a vehicle;
  communicating with a portable device through a second communication apparatus;
  canceling adoption of the update program by the target onboard electronic control unit for updating in response to information relating to cancelation of the update program is acquired when communication with the external server is successful, and in response to the information relating to cancelation cannot be acquired the target onboard electronic control unit for updating adopts the update program; and
  the target onboard electronic control unit for updating adopting the update program when communication with the external server has failed; and
  the target onboard electronic control unit for updating adopts the update program when the control unit fails to communicate with both the outside-vehicle communication apparatus and the portable terminal; and
  an identification information for identifying the portable terminal is stored in the predetermined storage area in the vehicle;
  the identification information is associated with a vehicle identification number of the vehicle and stored in a storage area to which the external server is capable of referencing; and
  the control unit establishes communication with the portable terminal on the basis of the identification information; and
  wherein a plurality of pieces of the identification information for identifying the portable terminal is assigned with a priority order for communication with the external server are stored in the predetermined storage area in the vehicle; and
  communication with the external server via the portable terminal is performed by the control unit on the basis of the priority order.

* * * * *